(12) United States Patent
Tune (10) Patent No.: US 10,185,667 B2
(45) Date of Patent: Jan. 22, 2019

(54) STORAGE CONTROLLER

(71) Applicant: ARM LTD, Cambridge (GB)

(72) Inventor: Andrew David Tune, Dronfield (GB)

(73) Assignee: Arm Limited, Cambridge (GB)

( * ) Notice: Subject to any disclaimer, the term of this patent is extended or adjusted under 35 U.S.C. 154(b) by 48 days.

(21) Appl. No.: 15/605,250

(22) Filed: May 25, 2017

(65) Prior Publication Data

US 2017/0357597 A1    Dec. 14, 2017

(30) Foreign Application Priority Data

Jun. 14, 2016 (EP) .................................... 16174467

(51) Int. Cl.

| | | |
|---|---|---|
| *G06F 12/00* | (2006.01) | |
| *G06F 12/121* | (2016.01) | |
| *G06F 12/0891* | (2016.01) | |
| *G06F 12/0893* | (2016.01) | |
| *G06F 12/0895* | (2016.01) | |
| *G06F 12/127* | (2016.01) | |
| *G06F 12/12* | (2016.01) | |

(52) U.S. Cl.
CPC ........ *G06F 12/121* (2013.01); *G06F 12/0891* (2013.01); *G06F 12/0893* (2013.01); *G06F 12/0895* (2013.01); *G06F 12/127* (2013.01); *G06F 12/12* (2013.01); *G06F 2212/1016* (2013.01); *G06F 2212/60* (2013.01); *G06F 2212/69* (2013.01)

(58) Field of Classification Search
None
See application file for complete search history.

(56) References Cited

U.S. PATENT DOCUMENTS

| | | | | |
|---|---|---|---|---|
| 6,799,241 | B2* | 9/2004 | Kahn .................. | G06F 12/0215 711/105 |
| 7,689,767 | B2* | 3/2010 | Dalal .................... | G06F 3/0605 710/104 |
| 7,895,409 | B2* | 2/2011 | Mendonca ............. | G06F 21/50 711/170 |
| 8,843,634 | B2* | 9/2014 | Riddle ............... | H04L 41/0893 340/2.8 |
| 9,195,409 | B2* | 11/2015 | Mills ..................... | G06F 3/0674 |
| 2004/0059875 | A1 | 3/2004 | Garg et al. | |
| 2007/0143546 | A1 | 6/2007 | Narad | |
| 2008/0052467 | A1* | 2/2008 | Thompson .......... | G06F 12/0864 711/128 |
| 2009/0132767 | A1 | 5/2009 | Gao et al. | |
| 2010/0115246 | A1* | 5/2010 | Seshadri ........... | G06F 17/30445 712/225 |
| 2010/0191916 | A1* | 7/2010 | Balakrishnan ...... | G06F 12/0808 711/134 |

(Continued)

FOREIGN PATENT DOCUMENTS

| | | |
|---|---|---|
| EP | 0 284 751 | 10/1988 |
| WO | WO 2010/144832 | 12/2010 |
| WO | WO 2015/030756 | 3/2015 |

*Primary Examiner* — John A Lane
(74) *Attorney, Agent, or Firm* — Leveque IP Law, P.C.

(57) ABSTRACT

There is described a storage controller, the storage controller having an array of entries, each entry associated with a partition of one or more partitions, wherein the controller comprises logic configured to identify a partition identifier of an entry and apply a policy to the entry based on or in response to the partition identifier.

18 Claims, 4 Drawing Sheets

(56) References Cited

U.S. PATENT DOCUMENTS

| | | | |
|---|---|---|---|
| 2010/0235580 A1 | 9/2010 | Bouvier | |
| 2010/0281027 A1* | 11/2010 | Duan | G06F 17/30584 |
| | | | 707/737 |
| 2010/0318742 A1* | 12/2010 | Plondke | G06F 12/1036 |
| | | | 711/123 |
| 2011/0010502 A1* | 1/2011 | Wang | G06F 12/121 |
| | | | 711/128 |
| 2012/0042268 A1* | 2/2012 | Ekpar | G06F 9/451 |
| | | | 715/763 |
| 2012/0198174 A1 | 8/2012 | Nellanet et al. | |
| 2012/0272006 A1 | 10/2012 | Moyer | |
| 2014/0145555 A1* | 5/2014 | Kurachi | A61B 5/02444 |
| | | | 310/311 |
| 2014/0173214 A1 | 6/2014 | Ramrakhyani et al. | |
| 2014/0281248 A1* | 9/2014 | Alameldeen | G06F 12/0864 |
| | | | 711/128 |
| 2014/0372696 A1 | 12/2014 | Tune et al. | |
| 2016/0203085 A1* | 7/2016 | Kranich | G06F 12/0802 |
| | | | 713/2 |
| 2017/0104682 A1* | 4/2017 | Zahid | G06F 17/30873 |
| 2017/0337241 A1* | 11/2017 | Newbern | G06F 17/30283 |
| 2018/0075125 A1* | 3/2018 | Stiel | G06F 17/30516 |
| 2018/0203807 A1* | 7/2018 | Krueger | G06F 12/0875 |

\* cited by examiner

FIGURE 4

STORAGE CONTROLLER

TECHNICAL FIELD

The present techniques relate to replacement in storage. More particularly, the techniques relate to replacement in a partitioned storage such as cache replacement in a partitioned cache.

BACKGROUND

Cache random access memory (RAM) is an expensive resource on a silicon chip and sharing a cache generally provides the best utilisation of the RAM. If a cache is shared among multiple concurrently running applications or threads then partitioning limits destructive interference, provides quality of service guarantees, and maximises utility.

Flexible partitioning or re-partitioning is required to support multiple use cases or system modes. For example, in a mobile platform, heterogeneous semiconductor intellectual property cores may share a cache but have differing quality of service requirements and would interfere with one another if the cache were not partitioned. Examples of systems benefiting from cache partitioning are: real time and best effort threads in networking applications; virtual machines in server applications; real-time and safety-critical threads in automotive applications; and those comprising central processor units (CPU); and graphical processor units (GPU).

Cache partitioning benefits the maximising of utility of the cache. Traditionally, cache partitioning is done by constraining placement, for example, way partitioning.

Partitioning based on controlling cache line replacement is preferable to partitioning by constraining placement because it permits fine-grained control of partition size, need not reduce associativity, and allows for easier re-sizing.

Some cache replacement policies attempt to partition the cache between thrashing and reused lines by inserting lines at different priorities. They are not able to partition the cache for purposes of quality of service and non-interference.

The present techniques seek to provide improvements over the prior art.

SUMMARY

According to a first technique, there is provided a storage controller, the controller having an array of entries, each entry associated with a partition of one or more partitions, wherein the controller comprises logic configured to identify a partition identifier of an entry and apply a policy to the entry based on or in response to the partition identifier.

According to a second technique there is provided a method for controlling a partitioned storage array, the partitioned storage array comprising one or more ways, each way comprising one or more entries, each entry associated with a partition, the method comprising: determining, from a set of entries, the respective partitions with which each entry of the set are associated with; applying to each entry of the set, a respective policy corresponding to the partition with which each entry is associated; selecting a victim from the set based on or in response to the applied respective policy for each entry.

BRIEF DESCRIPTION OF THE DRAWINGS

Embodiments will be described with reference to the accompanying figures of which.

DETAILED DESCRIPTION

Figure 1:
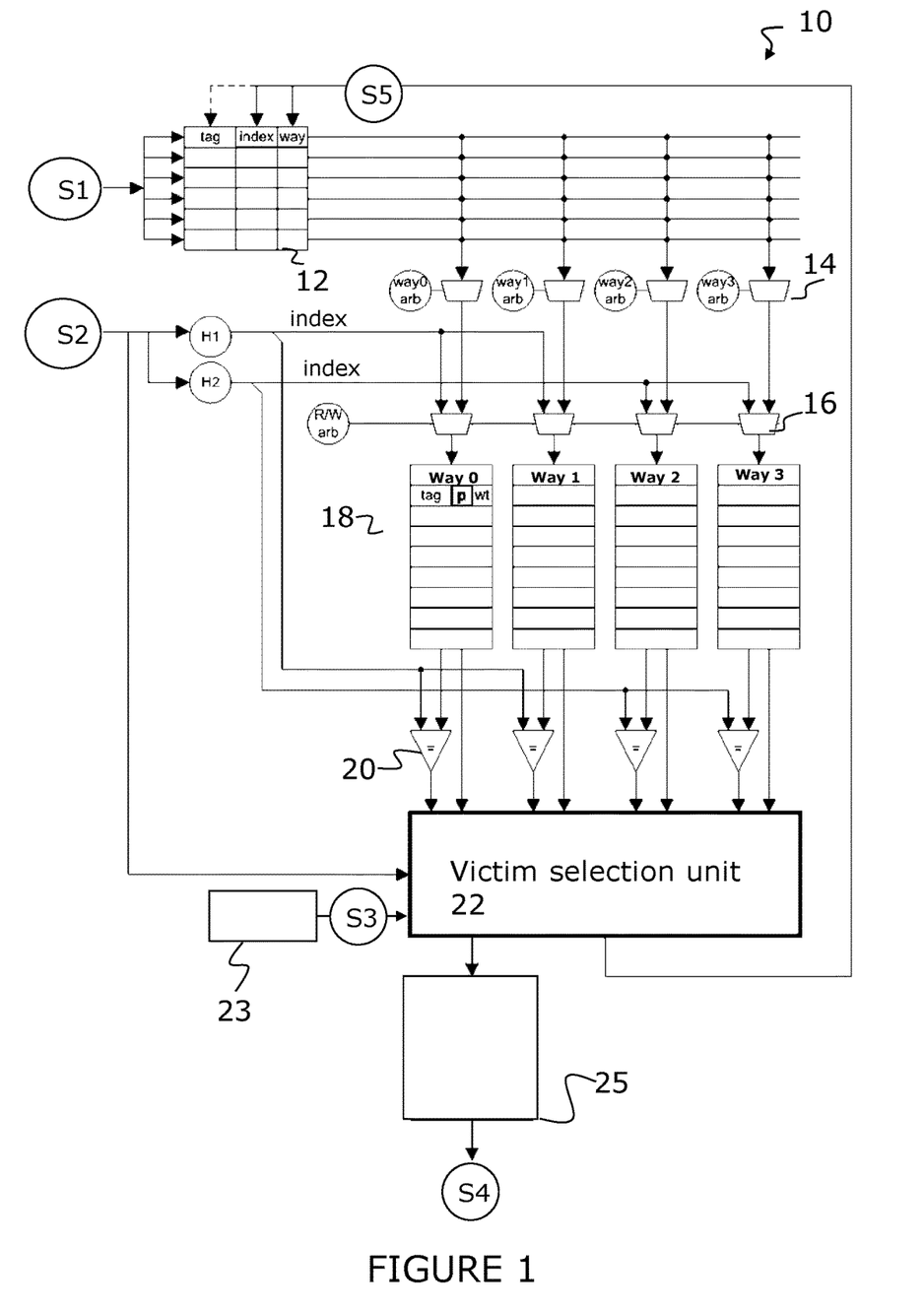
FIG. 1 is a schematic diagram of a controller including a victim selection unit of an embodiment.

FIG. 1, schematically shows an example controller 10, which in the present illustrative example is a cache controller having an associated tag array 18, the tag array 18 comprising a plurality of ways, where each of the ways comprises indexed entries (lines or blocks) for storing tag words.

In the present illustrative example, the tag array 18 is depicted as a four-way structure having Way0-Way3, but two, three or any number of ways could be implemented. It will also be appreciated, therefore, that the tag array may have some associativity, and, may for example be set-associative or the associativity may be provided by other suitable arrangements, such as multiple probes into the tag array.

Each tag word in the tag array 18 includes identifiers (e.g. bits) a tag value (tag), a partition ID value (P), and a replacement weight value (wt). The tag word may have other identifiers such as a "dirty" bit or valid bit.

The tag value is used for verifying a tag word with the tag value of an incoming request.

The replacement weight value is used for determining whether the tag word should remain in the cache or be evicted (i.e. that is becomes a victim).

The partition ID value corresponds to the partition with which the tag word is associated. Partitioning will be known to a person skilled in the art. Particularly in caches where the tags and data are de-coupled, partitions may be defined to work on the tags only and not to have associated data. Examples of these are monitor partitions (such as utility monitors), which estimate the efficacy of different polices or different bypass rates, without needing to consume a large number of tags. It may be useful to re-program the parameters of these polices to assist with finding the best settings, or when the policy being monitored becomes the real policy.

Cache controller 10 further comprises: update queue 12; update queue multiplexers 14; read/write multiplexers 16; comparators 20; victim selection unit 22; and data array controller 25.

Update queue 12 is for receiving RAM write requests S1 for writing to the tag array 18. Update queue 12 comprises a plurality of entries, each entry comprising a tag field (tag) corresponding to a tag in tag array 18, an index field (index) corresponding to an index of the tag array 18, a way field (way) corresponding to one of the ways of the tag array 18. Each entry may also comprise a partition ID (not shown) or replacement weights or any other information to be written back to the tags.

Update queue multiplexers 14 are provided for selecting an entry from the update queue 12, for example, by way of an arbiter, shown as 'way 0/1/2/3 arb', which way is selected to be written to in response to a RAM write request S1.

In the present illustrative example, S2 is a RAM read request signal, which is used to supply an index value (depicted as H1) to the first two ways Way 0 & Way 1 and an index value (depicted as H2) to the second two ways Way 2 & Way 3. In some embodiments, the H1 and H2 may comprised hash values derived from index of the RAM read request.

In the present illustrative embodiment, read/write multiplexers 16 corresponding to each way are provided for selecting, e.g. using an arbiter, shown as 'R/W arb', whether a tag word is written from update queue 12 to an indexed location in the tag array 18, or read from an indexed location in the tag array 18 based on whether a RAM read or write request signal is received. In alternative embodiments, a single multiplexer may be provided for all ways.

Comparators 20 are for selecting one of the ways for a RAM read request when the tag in the selected way matches the read request tag (a cache hit). If there is no match then a miss occurs, and the entries in the set referenced by the index in the incoming request is provided to the victim selection unit 22 as replacement candidate tag words (herein after "replacement candidates").

It will be seen therefore that multiplexers 16 and comparators 20 are the access logic for selecting a set of replacement candidates from an indexed set of locations in the tag array 18.

Victim selection unit 22 selects an entry (hereafter "victim tag word") from one or more of the replacement candidates, based on, for example, the partition ID's of the replacement candidates and other information as discussed below.

In the illustrative example, the victim selection unit 22 has an associated programming interface 23, which may be configured to generate one or more configuration inputs S3 for configuring the victim selection unit 22, for example to modify a victim selection function (e.g. parameters/policy) thereof.

It will be appreciated that the cache controller 10 may comprise an associated data array (not shown), the data array having data entries corresponding to the tag word entries in the tag array 18. Therefore, data array controller 25 is provided to communicate (S4) with such an associated data array to write back data to memory (e.g. if dirty) or to fetch data from a higher level memory for writing into the associated data array as appropriate.

Figure 2:
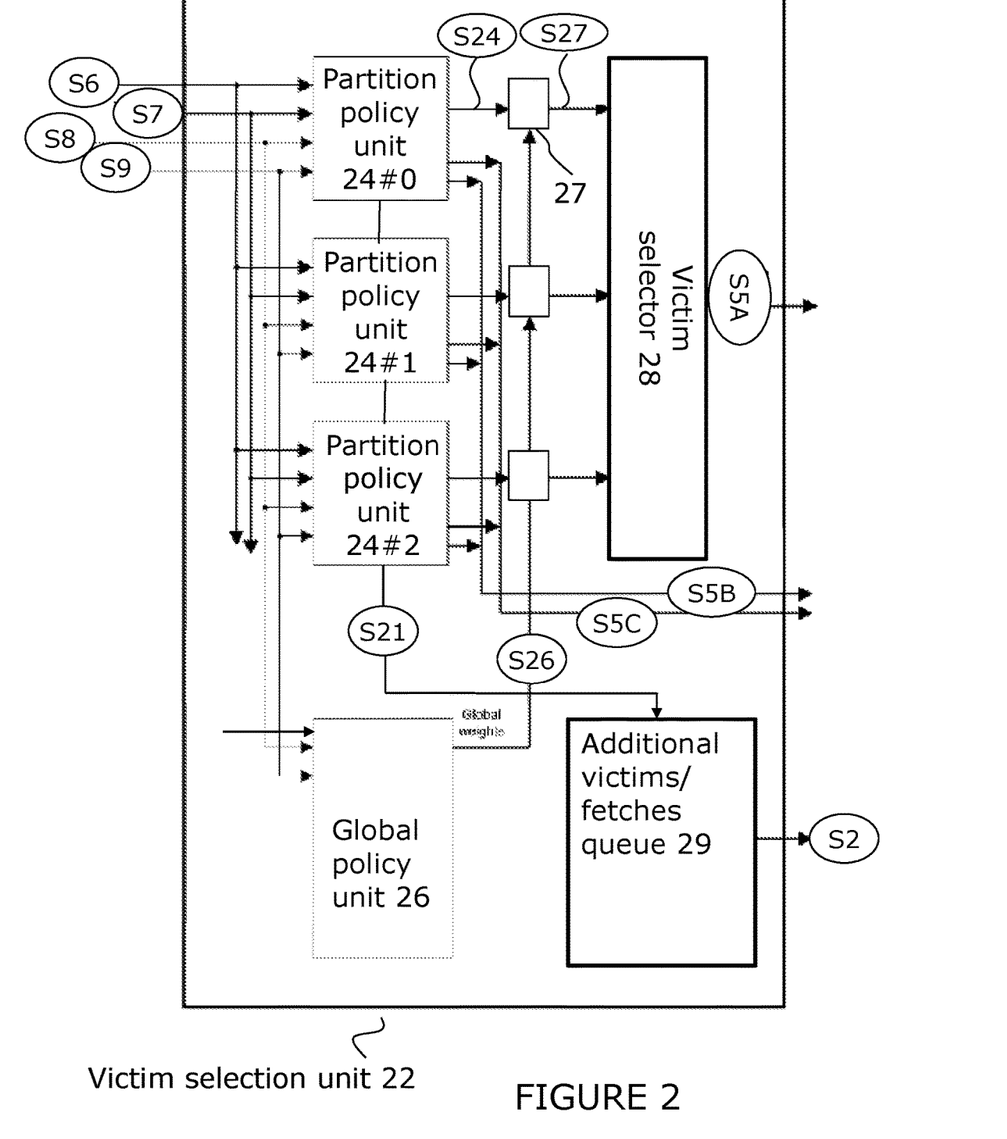
FIG. 2 is a schematic diagram of a victim selection unit of FIG. 1 including partition policy units of an embodiment.

FIG. 2 depicts victim selection unit 22 in greater detail, whereby victim selection unit 22 comprises: a plurality of partition policy units 24#N, (where N is an integer); global policy unit 26 (of which there could be none or more); victim selector 28; and additional victims/fetches queue 29 to allow pre-fetching, for example. Each partition policy unit 24#N is associated with a particular partition, as determined from a partition ID of a replacement candidate provided thereto.

Furthermore, each partition policy unit 24#N is configured to apply one or more cache policies to replacement candidate having a corresponding partition ID and then for determining an adjusted replacement weight S24 for each replacement candidate that belongs to that partition.

Three Partition policy units 24#0, 24#1, and 24#2 are depicted in FIG. 2, but fewer or a greater number of partitions units can be implemented in other embodiments for up to N partitions or up to M cache policies (where M is also an integer).

Selected input signals to each partition policy unit 24#N depicted in FIG. 2 include: partition IDs S6 and replacement weights S7 from all the replacement candidates; hit way S8 (if any); and request S9 (which may be a command on the bus, such as a particular type of coherent read or write, or information from where it originated such as the request address, request type input and a request logical processor ID (LPID) input).

Selected output signals from the partition policy units 24#N depicted in FIG. 2 include: adjusted replacement weights S24; updated partitions S5B; and updated weights S5C.

It will be noted that whilst some cache policies (e.g. cache replacement policies) only adjust the replacement weights on a "miss", such policies may be updated when there is a hit (e.g. in a least recently used policy), whereby updated weights S5C is provided to the update queue (not shown in FIG. 2) from where the updated weights would be used to update the corresponding replacement weight values in the tag array (not shown in FIG. 2).

Updated partitions signal S5B may be used to update the partition of a selected entry in the update queue 12. For example, when a first processor writes a tag word to the tag array a second processor starts using that tag word, S5B may be used to update the partition of the tag word so that it is associated with the partition of the second processor. Once it is associated with the updated partition it will start behaving with the policy of the updated partition.

Global policy unit 26 is for applying a global weight S26 to further adjust the adjusted replacement weights S24 using adjustment functions 27 (e.g. multipliers) in accordance with one or more global policies (e.g. a power saving policy, whereby the global policy relates to selecting the most power efficient entry to write to memory).

Therefore, whereas partition policy units 24#N only adjust the weights of replacement candidates associated with a particular partition, the global policy unit 26 optionally adjusts the weights of replacement candidates associated with one or more partitions and/or to a subset of partitions.

Global weight S26 is fed to adjustment functions 27 to further adjust the adjusted replacement weights from each partition policy unit 24#N so as to provide second adjusted weights S27 (hereinafter "victim weight") to the victim selector 28. In embodiments there may be zero adjustment of the adjusted replacement weights S24, so S27 may be identical, or substantially the same, as S24.

As will be appreciated, the global policy unit 26 may be programmable, and its associated policy(ies) used to adjust the adjusted replacement weight may be modified as appropriate.

The victim selector 28 selects a victim tag word from the set of replacement candidates. For example, the victim selector 28 compares the victim weights S27 from each of the partition policy units 24#N to determine the victim tag word, and the way having the victim tag word is also identified (the victim way).

In one example, the way having the victim tag word with the lowest victim weight S27 will be taken to be the victim way. The victim selector 28 feeds back the victim way to update queue 12 as S5A so that the specific location of a new tag in the update queue 12 will get a location in the tag array 18 as determined by the victim way and the index (as shown in FIG. 1).

In some examples, the victim selector 28 also feeds the victim tag, index and way into the data array controller (FIG. 1) to update the data array accordingly.

A partition policy unit 24#N may, as well as adjusting weights based on, or in response to a cache replacement policy, undertake further actions as defined by one or more further policies. Such further policies may include a pre-fetcher policy whereby the partition policy unit 24#N requests a number of additional words (e.g. as a pre-fetcher policy) or a write buffer policy that selects a number of entries to write to main memory. The cache controller will be provided with the appropriate components/logic/functions to respond to such further actions by the partition policy units 24#N.

Taking the example of a pre-fetcher policy, additional victims/fetches queue 29 is provided in the victim selection unit 22 to generate additional requests S2 in response to a request S21 for additional words from a partition policy unit 24#N.

Figure 3:
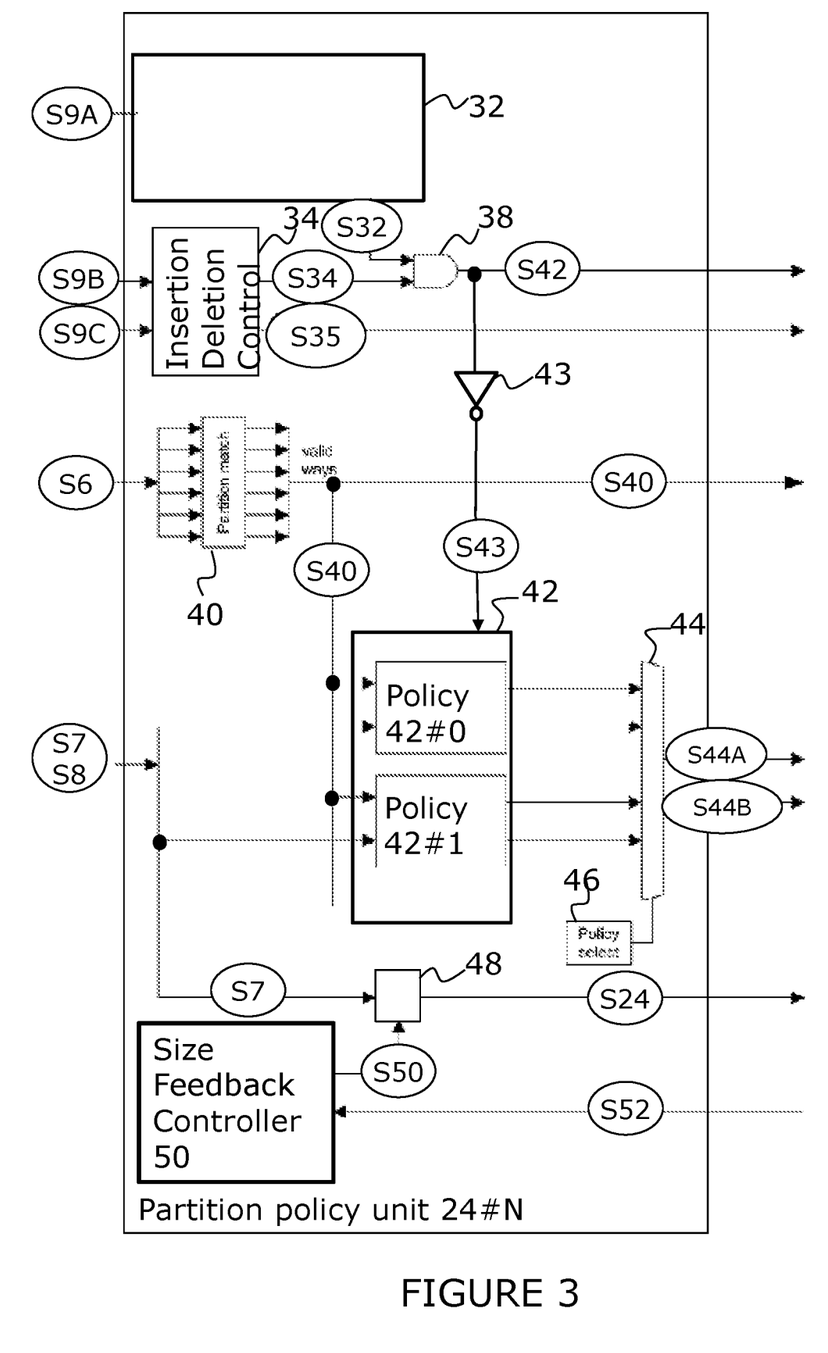
FIG. 3 is a schematic diagram of a partition policy unit of FIG. 2 according to an embodiment.

FIG. 3 shows a schematic example of a partition policy unit 24#N, (belonging to partition N), in greater detail.

In the present illustrative example, the partition policy unit 24#N comprises: bypass control 32; insertion/deletion control 34; partition match control 40; policy logic 42 having policy logic elements 42#M; multiplexer 44; policy select control 46; adjustment function 48; and size feedback control 50.

Partition match control 40 is a programmable control which takes the partition IDs (S6) of all the replacement candidates received at the victim selection unit, and outputs matched partition ID S40 identifying the zero or more replacement candidates belonging to a particular partition.

Policy logic 42 comprises one or more programmable policy logic elements 42#M. Two policy logic elements 42#0 and 42#1 are depicted in FIG. 3, but any number of policy logic elements can be deployed.

Each policy logic element 42#M comprises a cache policy which, for example, determines what the weight of the replacement candidate should be (e.g. a least recently used policy) or requests a number of additional words (e.g. a pre-fetcher policy).

The policy logic elements are programmable in that the cache policy or parameters may be programmed, e.g. via a programming interface. For example, an LRU policy may be replaced by a least frequently used (LFU) policy, or the number of additional words to be requested increased or decreased as required.

In the present illustrative example each of the policy logic elements 42#M receives inputs including: replacement weights from all the replacement candidates S7; hit way information S8 (if any), matched partition ID S40 and S43 (described below).

Each policy logic element 42#M applies a particular cache policy to the replacement weights S7 of the zero or more replacement candidate having the matched partition ID as determined by the partition match control 40.

Policy select control 46 controls multiplexer 44 to select the appropriate outputs S44A and S44B in accordance with a corresponding cache policy.

The selected policy logic element outputs a weight for the victim way and/or updated weights for the remaining ways S44A which is fed to the update queue (shown FIG. 1) and it may also output an insertion weight S44B which is fed to the victim selector (FIG. 2), whereby the victim selector compares the insertion weight with all of the victim weights across all of the partitions and then determines whether or not there is a victim. As an illustrative example, when the insertion weighting is less than the second adjust weights for all partitions then there would be no victim and no insertion.

It will be appreciated that the cache policy used by the policy select control 46 may be programmably modified at any time, for example via the programming interface associated with the victim selection unit.

In embodiments, the signal S40 also acts as an output signal strobe for adjusted weights and updated weights. The strobes are used to indicate which of the (per tag entry in the set) weights that are output by the partition policy unit 24N are valid—since every policy unit 24N may supply some value for all of the weights. The strobes may then used as a select input to a multiplexer (not shown) in the victim selection unit (FIG. 2) to select which version (from each of the policy units) of each new weights to use. The existence of any strobe S40 is then also used to determine if the entry needs be updated, i.e. if it needs to be sent to the update queue (also not shown).

In some caches, when a data set is bigger than the cache and an attempt is made to write the data set to the cache, the cache will continuously overwrite entries therein, resulting in cache thrashing. It is possible to select a percentage of addresses to write into the tag array so as to avoid constantly overwriting the entries therein. Therefore, bypass control 32 receives request S9A (e.g. comprising request address) and outputs a bypass signal S32 corresponding to a desired bypass ratio so as to avoid thrashing.

Insertion/deletion control 34 for determining what entries should be allocated and deallocated in the cache in response to a policy. The insertion/deletion control 34 is programmable, e.g. via programming interface, in that the policy associated therewith, or the parameters of the policy, maybe modified to determine whether entries are inserted/deleted.

In the present illustrative example, an insert type signal S34 and delete type signal S35 are generated in response to information in the request, such as a request type input S9B and a LPID input S9C.

Delete type signal S35 is used to de-allocate an entry in the update queue (shown in FIG. 1), for example, to predict when a processor no longer requires a particular entry in the tag array, that entry can be deallocated (and an entry in the associated data array may also be deleted).

In examples, the insert type signal S34 is provided as one input to AND gate 38 along with bypass signal S32 as a second input. AND gate 38 provides bypass signal S42 when an entry is required to be inserted in the tag array.

Some cache policies only update replacement weights when an insertion is required. Therefore, signal S43 may be used by the policy logic elements to terminate processing as appropriate, whereby, for example, if S43 indicates that there is no insertion then policy logic elements 42#M will terminate processing and/or may update their internal state accordingly (e.g. to indicate that no insertion occurred). Whilst bypass signal S42 is illustratively shown as being inverted by NOT gate 43 so as to generate S43, S43 may be generated using any suitable logic, component or function.

Size feedback control 50 generates a size value S50 based on, or in response to, input S52, which provides information relating to any insertions; deletions; changes in a particular partition.

Adjustment function 48 performs an operation (e.g. multiplication) on the size value S50 with replacement weights S7 to provide adjusted replacement weights (S24) which is used to determine how large, on average, a partition should be to permit soft control of a partition, thereby maintaining a target size for each partition when using soft partitioning.

The partition match control 40, policy logic control 46, bypass control 32, insertion/delete control 34, and size feedback control 50 are all programmable controls/logic/functions which can be modified/programmed, independently of the policy logic 42 selection, according to a policy and/or via the programming interface.

Example policies that may be used are described below:

A lock cache policy ensures that a cache entry can only be victimised by the same partition.

A pseudorandom cache policy is a replacement policy that selects a tag word entry in a pseudo random fashion without looking at weighting or how long since a cache entry has been used.

A pseudo least recently used (pLRU) cache policy is a replacement policy that selects a tag word if it is one of the least recently used cache entries. Such a cache policy uses the replacement weight to determine how recently the entry was used.

A pre-fetcher cache policy is an insertion policy that inserts pre-fetched lines into the cache.

A write buffer cache policy is a cache policy that cleans the cache entry to memory, for example, when it is determined that it is efficient to do so.

A snoop filter policy handles cache coherency between caches associated with different processors.

An evict policy may preferentially choose to victimise entries, and could be used to free up a buffer (e.g. a temporary buffer of data) and release the storage for reuse. Additionally, or alternatively, an evict policy may be used to empty a particular way for power management.

An invalidate policy may invalidate entries when next touched and prevent write back, and may be used to instantly free up a buffer (e.g. a temporary buffer of data) and release the storage for reuse.

Examples of programmable controls that may be included in partition policy units include:

A region decode control determines how to decode that a transaction belongs in a particular partition. A bypass sense control inverts the sense of the bypass fraction for a partition. An allocate mask control determines which transaction types and logical processor IDs (LPIDs) cause insertion. A de-allocate mask control determines which transaction types and LPIDs cause de-allocation. A way mask control allows insertion for certain ways. A way limit control limits the maximum number of ways allowed to be used by a partition. An is-monitor control turns off insertion in a data array. A bandwidth limit control would limit the amount of main memory bandwidth that the partition is allowed to use.

Figure 4:
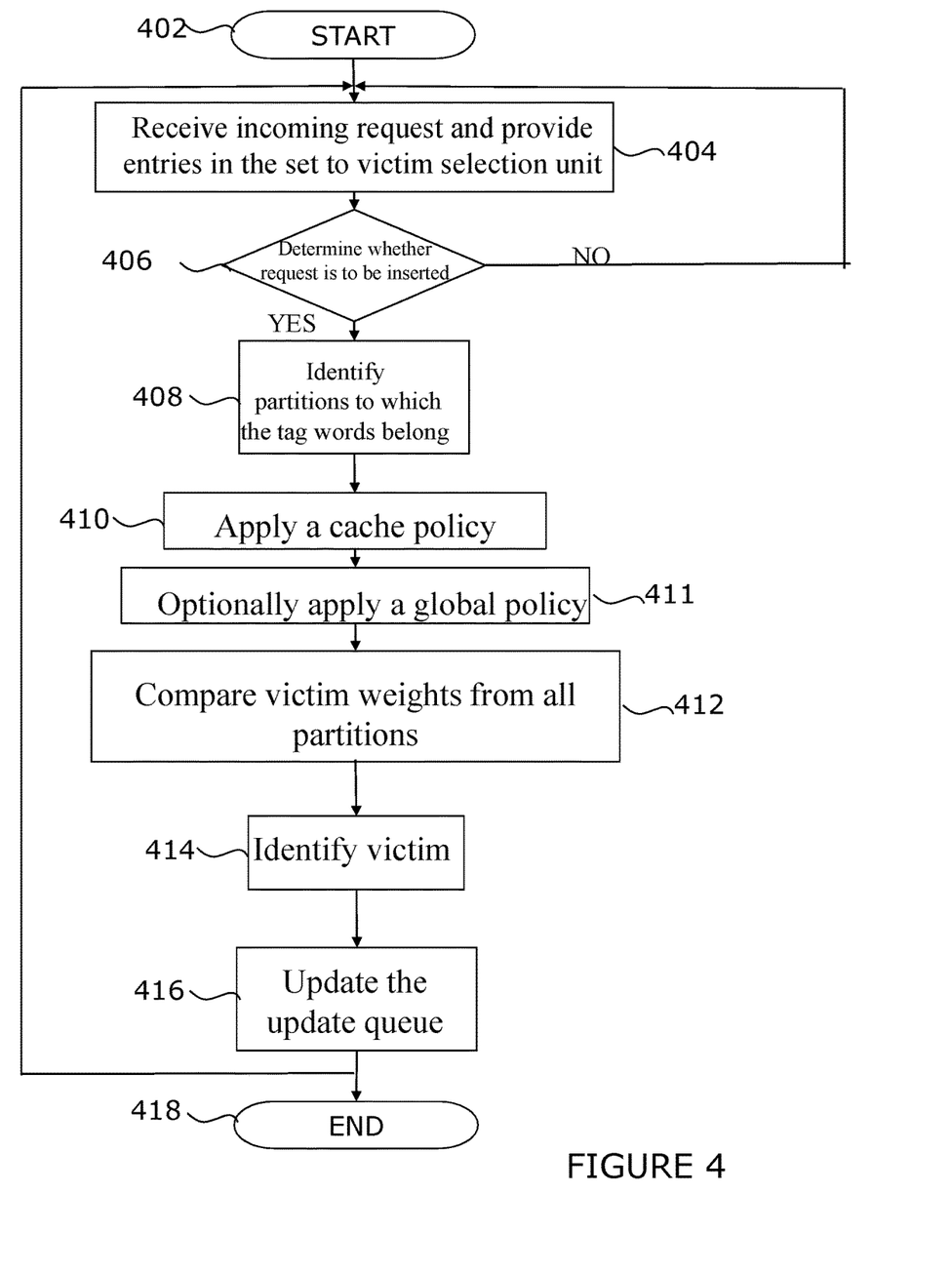
FIG. 4 is a method diagram of a cache controller process of an embodiment.

Referring to FIG. 4, a method of cache replacement according to an embodiment is described comprising logical process steps 402 to 418.

Step 402 is the start of the method when a microprocessor system is operational and read and write operations are performed on a storage array, the storage array comprising a plurality of ways, each comprising indexed locations.

Tag word entries in each of the ways are associated with a particular partition, and wherein each of the tag word entries comprise a tag value, a replacement weight value and a partition ID, the partition ID corresponding to the partition with which the tag word is associated.

At step 404, when starting with a read miss, the partition IDs and replacement weights of every tag word entry of the selected set are provided to the victim selection unit as replacement candidates.

At step 406, it is determined whether the request is to be inserted based on, for example, a bypass policy or properties other than address. If not, then no victim tag word is selected for the present request.

At step 408, when it is determined that the request is to be inserted, the partitions of the tag words in the indexed set are identified (e.g. from their associated partition IDs).

At 410, for replacement candidates in a particular partition, a currently programmed policy is applied by a corresponding partition policy unit, whereby the replacement candidate weights are adjusted according to size function (e.g. when big then make more likely to be a candidate to be replaced, and when small then make less likely).

At step 411, a global policy is optionally applied to the replacement candidates of one or more of the different partitions, or to a subset thereof.

At step 412, the adjusted weights from the replacement candidates of all partitions are compared, and, at step 414 a victim is identified based on, or in response to the comparison. For example, the replacement candidate having the highest adjusted weight may be taken to be the victim tag word.

At step 416, when the victim tag word is identified, the index and victim way of the victim tag word are fed to the update queue along with the tag part of the incoming address.

At step 418 the method ends.

It will be appreciated that a data operation may be performed where necessary when the victim is identified. For example, when performing an eviction, if the corresponding data has been modified, the modified data must be written back to a higher level of memory. Before, updating the update queue to write a new tag therein, new data may be fetched from memory as appropriate.

Furthermore, in embodiments, the victim selection unit may check that there is an available entry in the update queue before writing the information, and, if not, it may wait until there is an available entry.

The present techniques permit each partition to use a policy and other settings determined by looking up its partition ID (which may also be determined from placement) in a set of configuration registers. Each partition is not locked to a particular policy.

This has a large number of advantages: Firstly, this provides flexibility, as a wide range of policies can be used for any partition. For example, the partition to use for a cache itself may be determined by a traffic source, whereas the policy for that source need not always be the same e.g. in different use cases of that source.

The cache policy may be changed by a higher level of a cache control framework (which could be implemented in hardware, firmware running on a microcontroller, or driver or OS software), by knowledge of the platform use case, knowledge of the current system mode, or automatic control of the best policy to use.

One class of use of re-programming the policy type of a partition that gives a special advantage is when dealing with buffers that are in cache. A buffer of data, once known to be finished with, can be marked for preferential eviction. Simply re-programming the policy type to be 'clean and evict' or just 'invalidate' enables all the cache entries for the partition to be made available for re-use all in one go without any need to access them all individually could have an advantage over e.g. ROMI (read once, make invalid) if a whole buffer of data was read but then accessed randomly without any guarantee that all entries would be read. Double buffering is another case where changing the policy of a partition gives a particular advantage.

As will be appreciated by one skilled in the art, the present techniques may be embodied as a system, method or computer program product.

Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

The invention claimed is:

1. A storage controller, the controller having an array of entries, each entry associated with a partition of one or more partitions, wherein the controller comprises logic configured to identify a partition identifier of an entry and apply a policy to the entry based on or in response to the partition identifier.

2. The controller according to claim 1 further comprising access logic for selecting a set of entries from the array in response to a received request.

3. The controller according to claim 2, further comprising a partition policy unit for each partition, each partition policy unit configured to apply a partition specific policy to each entry having a corresponding partition identifier to determine a first adjusted weight.

4. The controller according to claim 3, wherein the partition policy unit is programmable with a particular policy.

5. The controller according to claim 3, further comprising a victim selector configured to select a victim entry from the set of entries based on the first adjusted weight.

6. The controller according to claim 5, further comprising a global policy unit for generating a global weight.

7. The controller according to claim 6, comprising an adjustment function for applying the global weight to adjust the first adjusted weight in accordance with an associated policy to generate a second adjusted weight.

8. The controller according to claim 7, wherein the adjustment function comprises a multiplier.

9. The controller according to claim 8, wherein the victim selector selects a victim entry from the set of entries based on the second adjusted weight.

10. The controller according to claim 3, wherein each partition policy unit comprises one or more selectable policy logic elements, whereby a first policy logic element is selectable for determining the first adjusted weight according to a first policy.

11. The controller according to claim 10, wherein the first policy logic element is selectable for determining an insertion weight according to the first policy.

12. The controller according to claim 3, wherein each partition policy unit comprises a programmable control for regulating bypassing of victim tag word determination according to a cache policy.

13. The controller according to claim 3, wherein each partition policy unit further comprises a programmable control for size scaling of replacement weights.

14. The controller according to claim 1, wherein each partition policy unit is configured to generate an insert type signal and a delete type signal according to a cache policy and information in the request.

15. The controller according to claim 1, wherein the policy comprises a replacement policy or an insertion policy.

16. The controller according to claim 1, further comprising an update queue for storing information relating to the victim entry.

17. A method for controlling a partitioned storage array, the partitioned storage array comprising one or more ways, each way having one or more entries, each entry associated with a partition, the method comprising:
determining, from a set of entries, the respective partitions with which each entry of the set are associated with;
applying to each entry of the set, a respective policy corresponding to the partition with which each entry is associated; and
selecting a victim from the set based on or in response to the applied respective policy for each entry.

18. A computer readable storage medium storing at least one computer program configured to control a data processing apparatus to perform the method of claim 17.

* * * * *